United States Patent
Yu et al.

(10) Patent No.: US 7,085,695 B2
(45) Date of Patent: Aug. 1, 2006

(54) SLIPPING CONTACT LINE MODEL AND THE MASS-CONSERVATIVE LEVEL SET IMPLEMENTATION FOR INK-JET SIMULATION

(75) Inventors: Jiun-Der Yu, Sunnyvale, CA (US); Shinri Sakai, Suwa (JP)

(73) Assignee: Seiko Epson Corporation, Tokyo (JP)

( * ) Notice: Subject to any disclaimer, the term of this patent is extended or adjusted under 35 U.S.C. 154(b) by 910 days.

(21) Appl. No.: 10/105,138

(22) Filed: Mar. 22, 2002

(65) Prior Publication Data

US 2003/0182092 A1 Sep. 25, 2003

(51) Int. Cl.
*G06G 7/48* (2006.01)
*G06G 7/50* (2006.01)

(52) U.S. Cl. .................... 703/9; 703/6; 703/13
(58) Field of Classification Search .............. 703/6, 703/9, 13
See application file for complete search history.

(56) References Cited

U.S. PATENT DOCUMENTS

| | | | |
|---|---|---|---|
| 6,179,402 B1 | 1/2001 | Suzuki et al. | |
| 6,257,143 B1 | 7/2001 | Iwasaki et al. | |
| 6,283,568 B1 | 9/2001 | Horii et al. | |
| 6,315,381 B1 | 11/2001 | Wade et al. | |
| 6,322,186 B1 | 11/2001 | Shimizu et al. | |
| 6,322,193 B1 | 11/2001 | Lian et al. | |
| 6,579,724 B1 * | 6/2003 | Woodward | 436/180 |

FOREIGN PATENT DOCUMENTS

JP 09-323431 12/1997

OTHER PUBLICATIONS

Miller, "Improvements in Computing Multiple Phase Flows", Dissertation, Doctor of Philosophy in Mathematics, University of California, Los Angeles, 1998, pp. 1-53.*
Rivkind et al., "On Nonsymmetric Two-dimensional Viscous Flow through an Aperture", http://citeseer.ist.psu.edu/141663.html, 1998, pp. 1-26.*
Sussman et al., "An Adaptive Level Set Approach for Incompressible Two-Phase Flows", Journal of Computational Physics, 1998, pp. 1-44.*
Meinhart et al., "The Flow Structure Inside a Microfabricated Inkjet Printhead", Journal of Microelectromechanical Systems, vol. 9, Issue 1, Mar. 2000, pp. 67-75.*

(Continued)

*Primary Examiner*—Kamini Shah
*Assistant Examiner*—Herng-der Day
(74) *Attorney, Agent, or Firm*—Michael T. Gabrik

(57) ABSTRACT

A macroscopic physical model simulates and analyzes ink ejection from a piezoelectric print head. The model handles the slipping contact line problem and introduces a mass-conservative finite difference implementation using the level set method. First, the critical angle approach is adopted. The triple point is allowed to move if the critical angle is exceeded. Second, the no-slip boundary condition in the neighborhood of the triple point is relaxed and substituted by the free-slip boundary condition. Third, to allow the triple point to quickly accelerate when the critical angle is exceeded, an extra surface tension is added as a body force term in the governing equation. Fourth, the level set method is adopted to implement the slipping contact line model. Finally the above idea is incorporated in a fluid solver based on the higher-order projection method.

17 Claims, 6 Drawing Sheets

OTHER PUBLICATIONS

"Projection Method for Viscous Incompressible Flow on Quadrilateral Grids", John B. Bell, et al., AIAA Journal, vol. 32, No. 10, Oct. 1994, pp. 1961-1969.

"A Second-Order Projection Method for the Incompressible Navier-Stokes Equations", John B. Bell, et al., Journal of Computational Physics, vol. 85, No. 2, Dec. 1989, pp. 257-283.

"Computing Minimal Surfaces via Level Set Curvature Flow", David L. Chopp, Mathematics Department, University of California, Berkeley, California, Journal of Computational Physics 106, pp. 77-91, 1993.

"Fronts Propagating with Curvature-Dependent Speed: Algorithms Based on Hamilton-Jacobi Formulations", Stanley Osher, Department of Mathematics, University of California, Los Angeles and James A. Sethian, Department of Mathematics, University of California, Berkeley, California, Journal of Computational Physics 79, pp. 12-49, 1988.

"A Level Set Approach for Computing Solutions to Incompressible Two-Phase Flow", Mark Sussman, et al., Department of Mathematics, University of California, Los Angeles, California, Journal of Computational Physics 114, pp. 146-159, 1994.

"A Projection Method for Incompressible Viscous Flow on Moving Quadrilateral Grids", David P. Trebotich, Department of Mechanical Engineering, University of California, Berkeley, California and Phillip Colella, Applied Numerical Algorithms Group, Lawrence Berkeley National Laboratory, Berkeley, California, Journal of Computational Physics 166, pp. 191-217, 2001.

"A Second-Order Projection Method for Variable-Density Flows", John B. Bell, et al., Lawrence Livermore National Laboratory, Livermore, California, Journal of Computational Physics 101, pp. 334-348, 1992.

* cited by examiner

SLIPPING CONTACT LINE MODEL AND THE MASS-CONSERVATIVE LEVEL SET IMPLEMENTATION FOR INK-JET SIMULATION

BACKGROUND OF THE INVENTION

1. Field of the Invention

The present invention provides a macroscopic physical model to simulate and analyze ink ejection from a piezoelectric print head. More particularly, the model of this invention addresses the slipping contact line problem and introduces a mass-conservative finite difference implementation using the level set method so that more precise control of ink droplet size and shape can be achieved. The model may be embodied in software, hardware or combination thereof and may be implemented on a computer or other processor-controlled device.

2. Description of the Related Art

More precise control over the ink ejection process, and in particular ink droplet size, can improve the quality of the final printed product. To achieve such control, however, requires a model that accurately simulates fluid flow including droplet size and shape. Existing fluid flow models tend to impose certain conditions that lead to problems. For example, some existing fluid flow models enforce a no-slip boundary condition everywhere, which means that the triple point (the point, line or curve where three phases—two fluids and a solid—meet) does not move during simulation. While this simplifies the computations, it is unrealistic.

There are other problems that are typically encountered in trying to numerically simulate fluid flow with static or slipping contact lines. If the no-slip boundary condition for viscous fluids is enforced everywhere, the triple point will not move since the fluid velocity is zero at the wall. If one chooses to use a critical angle, which is the maximum angle allowed for the triple point to stay fixed, the conservation of mass may be violated due to no connection between the triple point movement and the fluid solver. If one chooses to solve the microscopic physics equations governing fluid flow at the immediate vicinity of the triple point, the scale of the microscopic physics will result in the need of a large amount of CPU time.

OBJECTS AND SUMMARY OF THE INVENTION

Objects of the Invention

It is therefore an object of the present invention to overcome the above-mentioned problems.

It is another object of this invention to provide a macroscopic physical model to simulate and analyze fluid flow, and in particular ink ejection, in a manner that overcomes the above-mentioned problems.

Summary of the Invention

According to one aspect of this invention, a method for simulating and analyzing fluid flow through, and ejection from, a channel is provided. The method comprises the steps of: (a) setting a pressure indicative of the flow of a first fluid into the channel; (b) calculating, based on the inflow pressure of the first fluid, (i) the flow velocity of the first fluid through the channel, (ii) a triple point formed at the intersection of the first fluid, a second fluid and a wall of the channel, and (iii) a pressure related to the flow of the first fluid through the channel, wherein, in making the calculations in step (b), a free-slip boundary condition is imposed near the triple point allowing the triple point to move if a contact angle between the first fluid and a channel wall is greater than or equal to a first angle value or if the contact angle is less or equal to a second angle value which is less than the first angle value, and a surface tension is included as a body force term in the calculation of the flow velocity of the first fluid through the channel; and (c) simulating the flow of the first fluid through, and ejection from, the channel.

The following features may also be added to, or incorporated into, the basic method. With respect to the triple point, it is permitted to move toward the second fluid if the contact angle is greater than or equal to the first angle value and is permitted to move toward the first fluid if the contact angle is less than or equal to the second angle value, but is not permitted to move if the contact angle is greater than the second angle value and less than the first angle value. More particularly, the triple point is accelerated toward the second fluid in accordance with the surface tension body force term if the contact angle is greater than the first angle value, and the triple point is accelerated toward the first fluid in accordance with the surface tension body force term if the contact angle is less than the second angle value.

Also, if the contact angle is greater than or equal to the first angle value and a velocity component of the first fluid velocity is greater than zero, or if the contact angle is less than or equal to the second angle value and the velocity component of the first fluid velocity is less than zero, the free-slip boundary condition is imposed within a predetermined radius.

Preferably, the level set method is employed in the calculations in step (b).

In the method, preferably the first fluid represents ink, the second fluid represents air, and the channel represents an ink-jet nozzle that is part of a piezoelectric ink-jet head.

In another aspect, the invention involves an apparatus for simulating and analyzing fluid flow through, and ejection from, a channel, comprising: means for calculating, based on an inflow pressure indicative of the flow of a first fluid into the channel, (i) the flow velocity of the first fluid through the channel, (ii) a triple point formed at the intersection of the first fluid, a second fluid and a wall of the channel, and (iii) a pressure related to the flow of the first fluid through the channel, wherein, in making the calculations, a free-slip boundary condition is imposed near the triple point allowing the triple point to move if a contact angle between the first fluid and a channel wall is greater than or equal to a first angle value or if the contact angle is less or equal to a second angle value which is less than the first angle value, and a surface tension is included as a body force term in the calculation of the flow velocity of the first fluid through the channel; and means for simulating the flow of the first fluid through, and ejection from, the channel.

The calculating means may comprise a program of instructions embodied in software, hardware, or combination thereof. The simulating means may comprise a display for visually observing the simulation.

Preferably the first fluid represents ink, the second fluid represents air, and the channel represents an ink-jet nozzle that is part of a piezoelectric ink-jet head.

In accordance with further aspects of the invention, any of the above-described methods or steps thereof may be embodied in a program of instructions (e.g., software) which may be stored on, or conveyed to, a computer or other processor-controlled device for execution. Alternatively, any of the methods or steps thereof may be implemented using functionally equivalent hardware (e.g., application specific integrated circuit (ASIC), digital signal processing circuitry, etc.) or a combination of software and hardware.

Other objects and attainments together with a fuller understanding of the invention will become apparent and appreciated by referring to the following description and claims taken in conjunction with the accompanying drawings.

BRIEF DESCRIPTION OF THE DRAWINGS

In the drawings wherein like reference symbols refer to like parts.

DESCRIPTION OF THE PREFERRED EMBODIMENTS

A. Introduction

Figure 1:
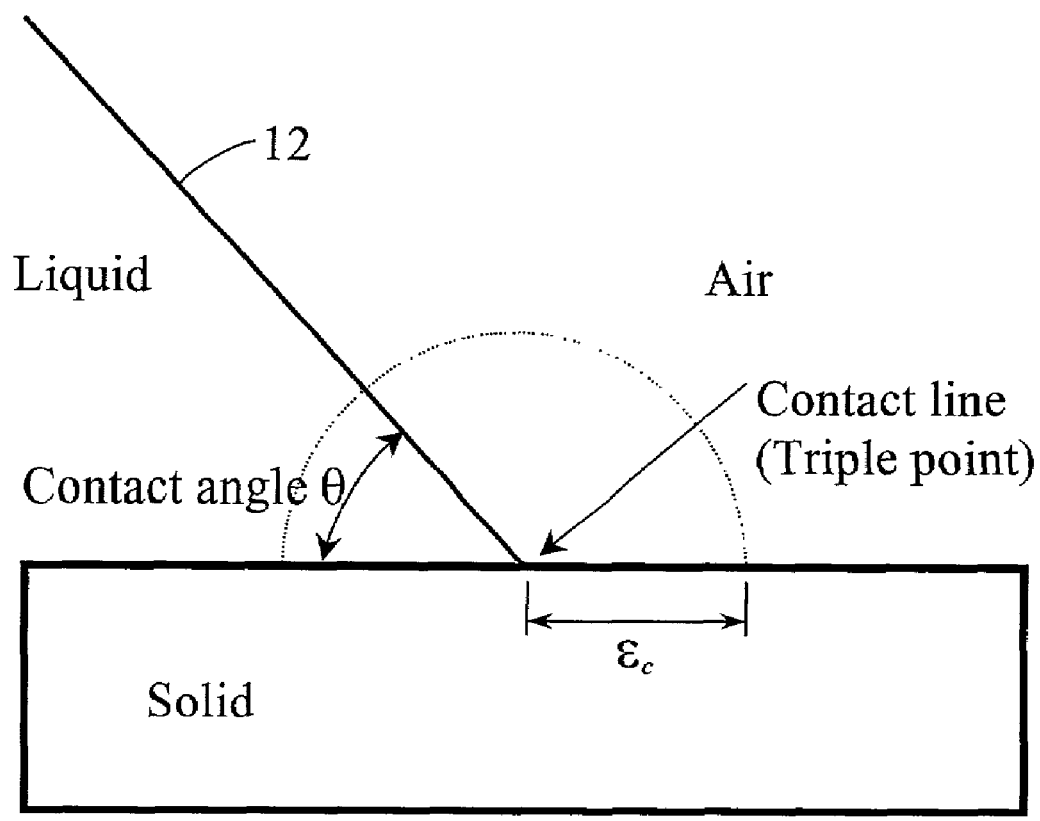
FIG. 1 is a schematic diagram showing an interface between two immiscible fluids (e.g., a liquid-air interface) and a contact line or triple point formed at the intersection of the two immiscible fluids and a solid.

As shown in FIG. 1, a "contact line" is formed at the intersection of two immiscible fluids (a liquid and air, for example) and a solid. In two space dimensions, the contact line is a straight line perpendicular to the paper. In three-dimensional axi-symmetric spaces, the contact line is actually a loop. A "contact line" is also called "triple point" because it is the point (or the line or the curve) where the three phases (two fluids and a solid) meet each other. Note that "slipping contact line," "contact line," and "triple point" will be used interchangeably herein. In many fluid systems, the interaction between the three phases in the immediate vicinity of a contact line can significantly affect the statics as well as the dynamics of the two immiscible fluids. Capillary tubes, spreading petroleum on ice, and ink flows in a print head nozzle are just a few examples. In attempting to numerically simulate fluid flow with a slipping contact line, one encounters several problems, as previously discussed in the background section.

Figure 2:
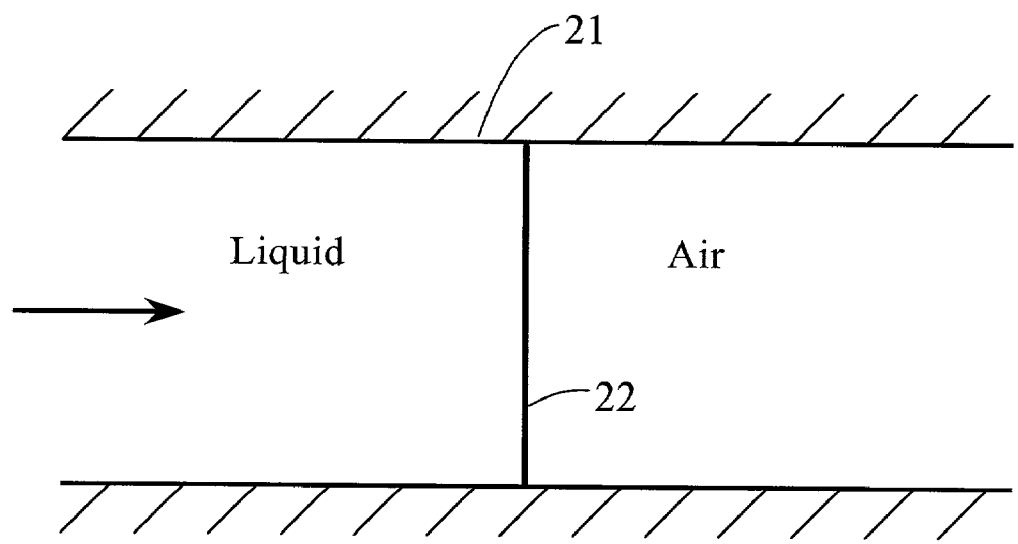
FIGS. 2(a) and 2(b) are schematic illustrations of a liquid-air interface in a channel in which the liquid is flowing.
Figure 2:
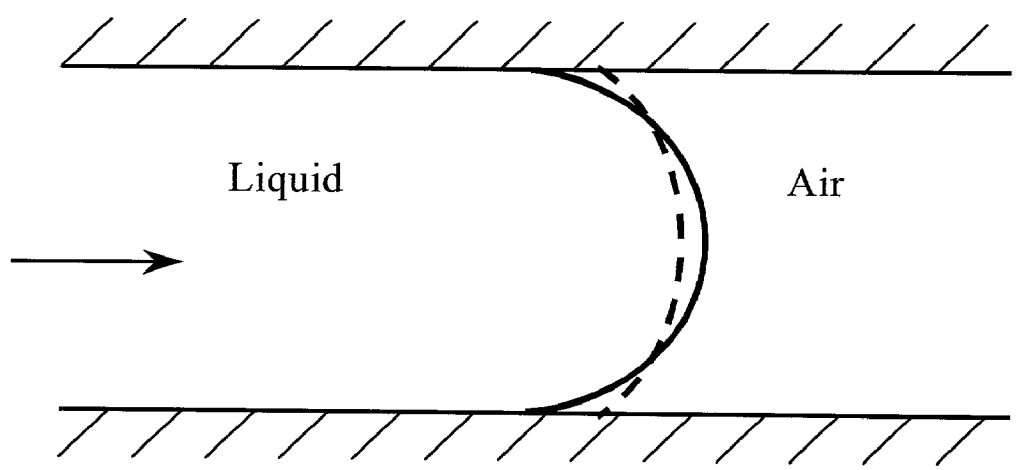

One simple example demonstrates the importance and influence of a contact line model. FIG. 2 shows a channel 21, which may be part of an ink-jet nozzle, with a liquid-air interface. The initial position of the interface 22 is a straight line as shown in FIG. 2(a). Suppose the inflow velocity is toward the right, as shown by the arrow, and the triple point is not allowed to move. After a period of time the new surface may resemble the solid line in FIG. 2(b). However, if the triple point is allowed to move, the dash line may represent the new surface position. Hence, the contact line model is not only related to the physics but is also essential to the solution uniqueness.

Figure 5:
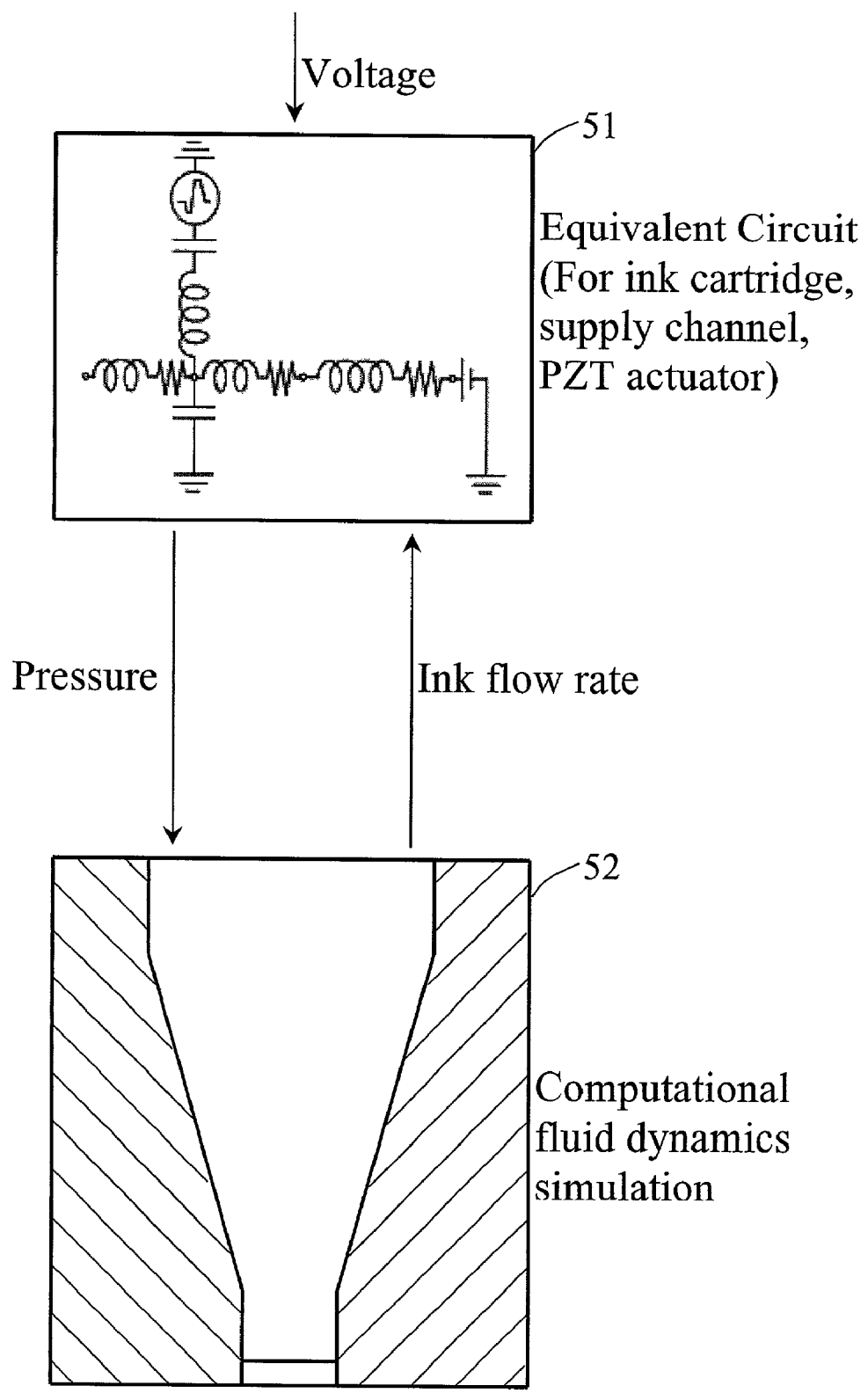
FIG. 5 is a block diagram illustrating ink-jet simulation according to embodiments of the invention.

Results of computational fluid dynamics (CFD) ink-jet simulation have been very helpful in the design of piezoelectric print heads. FIG. 5 shows how a practical ink-jet simulation may be done. An equivalent circuit 51 receives as an input the dynamic voltage to be applied to the piezoelectric (PZT) actuator and simulates the effect such voltage has on the ink cartridge, supply channel, and PZT actuator. Circuit 51 calculates an inflow pressure that drives CFD code 52. The CFD code then solves for the fluid velocity, pressure, and interface position, and feeds back the ink flow rate to the equivalent circuit 51.

The sequence is repeated until the end of ink droplet ejection. Since the ink-air interface slides back and forth along the nozzle wall, an appropriate slipping contact line model is essential for the simulation quality. Commercial simulation codes usually allow users to assign a constant contact angle θ (see FIG. 1) for ink jet simulation. However, this kind of simple and incorrect contact model usually results in unsatisfactory simulation results.

This invention provides a macroscopic physical model to govern the slipping contact line and introduces a mass-conservative numerical implementation using the level set method. First, the critical angle approach is adopted. The triple point is allowed to move if the critical angle is exceeded. Second, the no-slip boundary condition in the neighborhood of the triple point is relaxed and substituted by the free-slip boundary condition. Third, to allow the triple point to quickly accelerate when the critical angle is exceeded, an extra surface tension is added as a body force term in the governing equation. Fourth, the level set method is adopted to implement the slipping contact model. Finally the above idea is incorporated in a fluid solver based on the higher-order projection method.

The present invention can be applied to any two-phase flows with slipping contact line in two or three dimensions. However, for ease of discussion, we assume that the two phases are liquid and air and explain the detail in two dimensions.

B. Governing Equations

Since the level set method is used to capture the free surface and to implement the contact model, the governing equations are presented using the level set notation.

The governing equations for two-phase flows include the continuity equation (1) and the Navier-Stokes equations (2), which are set forth in the Appendix along with the other numbered equations referenced in the following discussion. In these equations, the rate of deformation tensor and the fluid velocity are defined in equations (3).

$$\frac{D}{Dt} = \frac{\partial}{\partial t} + (u \cdot \nabla)$$

is the Lagrangian time derivative, ρ the relative density, p the pressure, μ the relative dynamic viscosity, κ the curvature, δ the Dirac delta function, Re the Reynolds number, Fr the Froude number, We the Weber number, and φ the level set. The relative density, relative dynamic viscosity, and curvature are all defined in terms of the level set φ as in equation (4). Without loss of generality, it is assumed the gravitational force is in the −y (i.e., −$e_2$) direction.

The level set is initialized as the signed distance to the interface, i.e., the level set value is the shortest distance to the interface on the liquid side and is the negative of the shortest distance on the air side. The unit normal on the interface, drawn from fluid 2 into fluid 1, and the curvature of the interface can be expressed in terms of $\phi(x,y,t)$ as equation (5).

The relative density ratio $\rho(\phi)$, relative viscosity ratio $\mu(\phi)$, Reynolds number Re, Weber number We, and Froude number Fr are defined by equations (6), where $H(\phi)$ is the Heaviside unit step function, $\sigma$ is the surface tension constant, g is the gravitational acceleration, U is the characteristic velocity, L is the characteristic length, $\rho_1, \mu_1$ are the density and viscosity, respectively, of fluid 1, and $\rho_2, \mu_2$ are the density and viscosity, respectively, of fluid 2. The characteristic velocity and characteristic length can be arbitrarily chosen. They do not influence the result of simulation.

Since the interface moves with the fluid, the evolution of the level set is governed by the level set convection equation (7). At any instant of the simulation, the position and shape of the interface is given by the position of the zero level set.

C. The Macroscopic Contact Model

Figure 3:
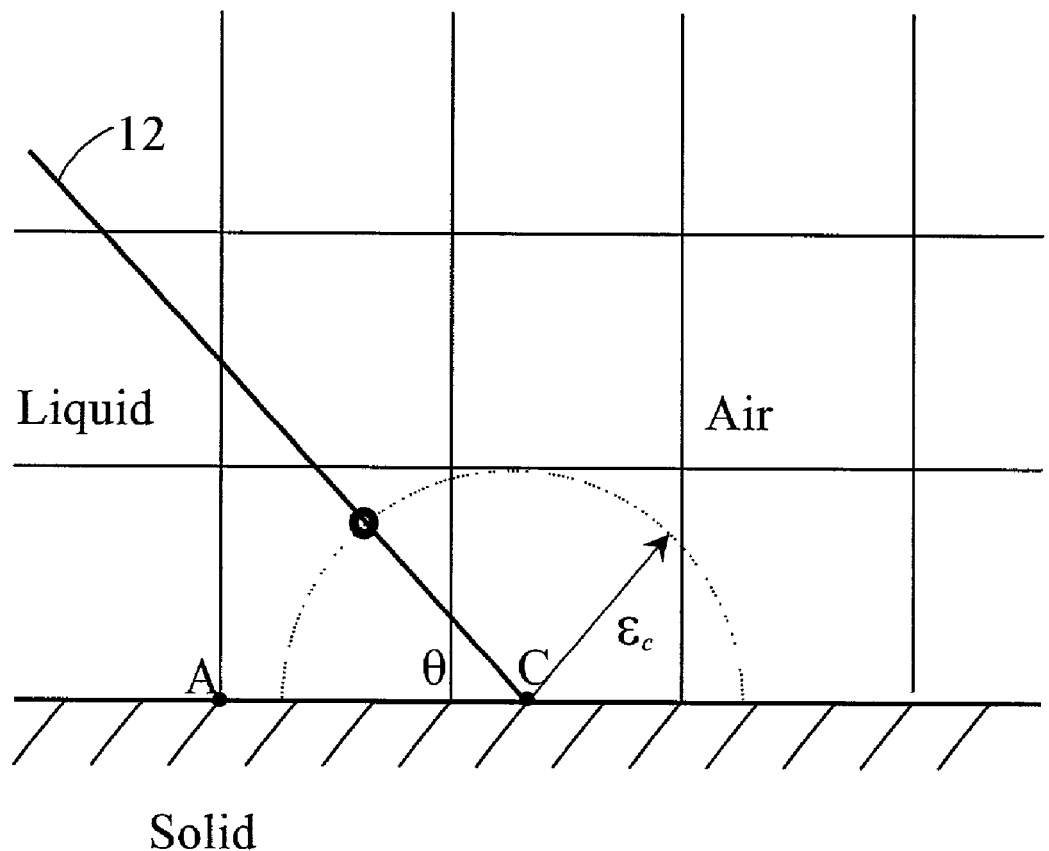
FIG. 3 is a grid diagram showing a liquid-air interface and a contact line formed at the liquid-air-solid intersection.
Figure 4:
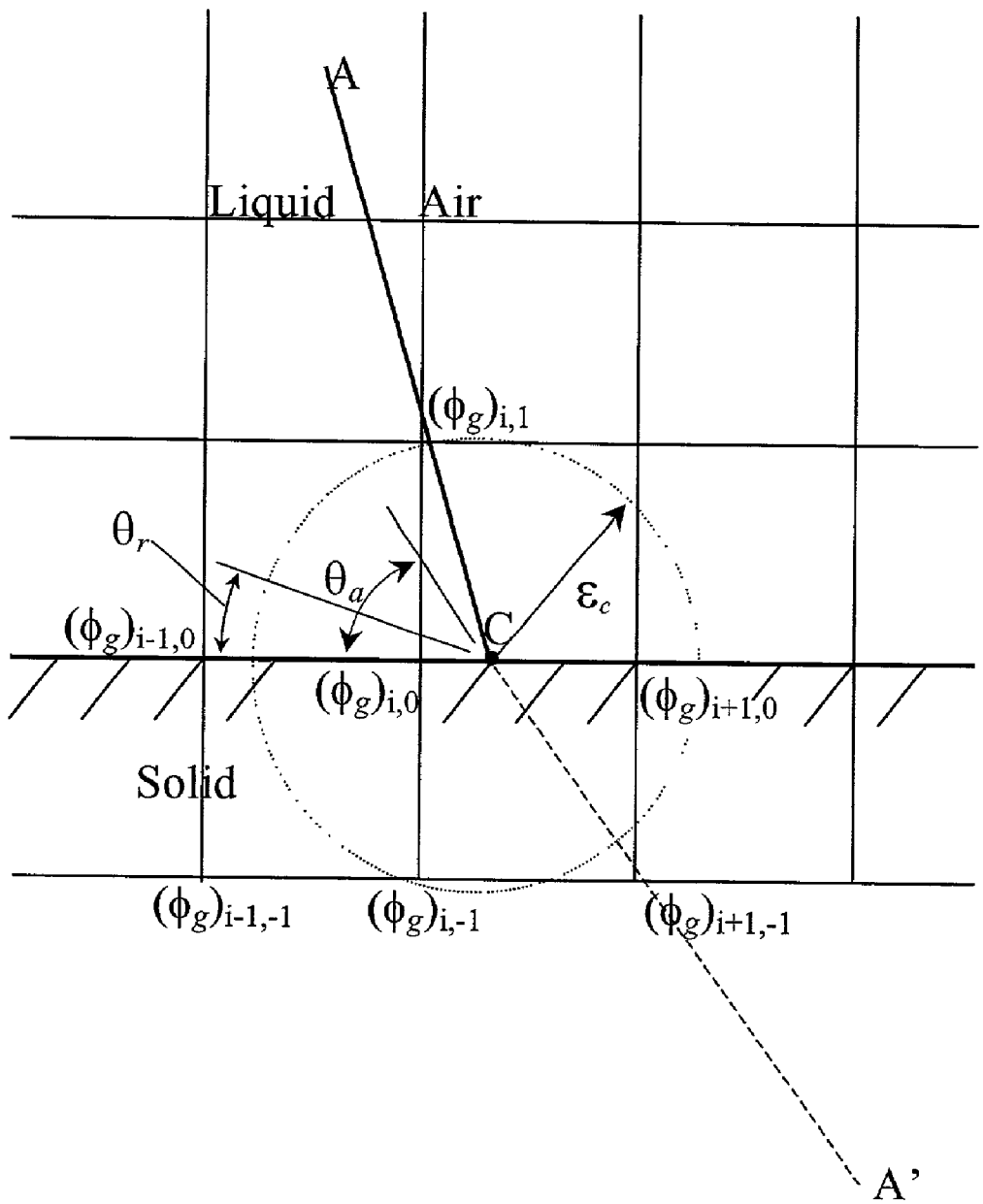
FIG. 4 is a more detailed grid diagram showing a liquid-air interface and a contact line formed at the liquid-air-solid intersection.

Consider the air-liquid interface 12 and the contact line shown in FIGS. 1 and 3. A contact angle $\theta$ is defined as the angle made by the liquid-air interface 12 and the solid, measured from the side of the liquid by approaching the contact line (i.e., the triple point) as close as possible. Referring now to FIG. 4, in addition to FIGS. 1 and 3, the advancing critical contact angle $\theta_a$ and receding critical contact angle $\theta_r$ are the maximum and minimum contact angles for the triple point to stay static. Under most situations $\theta_r < \theta_a$. But the receding critical angle may be very close or even equal to the advancing critical angle. Actual values of $\theta_a$ and $\theta_r$ depend on both the fluids and the solid surface. For one dye-based ink and print head nozzle wall, $\theta_a$ and $\theta_r$ are about 80° and 30°.

The following criteria are used for deciding whether the triple point can move or not:

The triple point should not move if $\theta_r < \theta < \theta_a$.
The triple point is allowed to move toward the air if $\theta \geq \theta_a$.
The triple point is allowed to move toward the liquid if $\theta \leq \theta_r$.

If the triple point is not allowed to move, the boundary condition at the solid wall is the no-slip condition. If the triple point is allowed to move, the no-slip condition at the close vicinity of the triple point needs to be relaxed. For this purpose, a contact length $\epsilon_c$ is introduced. As shown in FIGS. 1, 3 and 4, $\epsilon_c$ is the radius of the contact region, i.e., the region around the triple point encompassed by the dash circle of radius $\epsilon_c$. This characteristic length also depends on the materials (air, liquid, and solid). By way of example, in ink-jet simulations, the inventors have used $\epsilon_c$ values in the range of 0.35 to 0.55 microns and achieved very good results. The velocity $v_c$ is the tangential component (i.e., the component parallel to the solid wall) of the velocity at the intersection of the dash circle and the interface. Whether and where to relax the no-slip boundary condition is decided as follows:

if $\theta \geq \theta_a$ and $v_c > 0$, or $\theta \leq \theta_r$ and $v_c < 0$, specify the free-slip boundary condition at the part of the solid wall that is within the dash circle of radius $\epsilon_c$; keep the no-slip boundary condition elsewhere.

It should be noted that in the model of the present invention, relaxation of the no-slip boundary condition may occur only at a small neighborhood of the triple point. So, the no-slip condition is still enforced for most part of the solid wall.

The contact angle is allowed to be larger than the advancing critical angle or smaller than the receding critical angle. However, if the contact angle is larger than the advancing critical angle (smaller than the receding critical angle), the triple point should be accelerated forward (backward) so that the contact angle will return to the range defined by the critical angles. The actual acceleration of the triple point, when the advancing critical angle is exceeded (or the receding critical angle is not reached), is determined by the resultant effect of an extra surface tension term $B_c$ which the inventors introduce, the fluid density and velocity at the axis of symmetry, as well as other factors. The model of this invention introduces the extra surface tension $B_c$ at the triple point:

$B_c = -\delta_c \kappa_c(\theta,\phi) \nabla \phi / (\rho(\phi) We_c)$, where $\kappa_c$ is a function of the contact angle $\theta$ and level set $\phi$, $\delta_c$ is the Dirac delta function which is 1 at the triple point and vanishes elsewhere, and $We_c$ is a material constant. The function $\kappa_c(\theta,\phi)$ should vanish for $\theta_r < \theta < \theta_a$. Its magnitude should be proportional to $\theta - \theta_a$ if $\theta > \theta_a$ and to $\theta_r - \theta$ if $\theta < \theta_r$.

Similar to the real surface tension in the Navier-Stokes equations, this extra surface tension has been formulated in the form of a body force. The advantage is immediate since we can add the extra surface tension term directly into the right hand side of equation (2) to facilitate the numerical implementation. The result is equation (8).

There are infinitely many ways for choosing the function $\kappa_c$. One simple way will be explained together with the numerical implementation. For simplicity, one may choose $We_c$ to be the Weber's number.

D. Numerical Implementation

Here, a finite difference numerical scheme on a uniform rectangular grid is described. The velocity and level set are on grid points while the pressure is on cell centers. In the following, the superscript n (or n+1) denotes the time step (see equation (9)).

Suppose quantities $u^n$, $p^n$, $\phi^n$ are known; the purpose is to obtain $u^{n+1}$, $p^{n+1}$, $\phi^{n+1}$ which satisfy the condition of incompressibility (equation (1)) and the modified Navier-Stokes equations (8). The proposed numerical scheme can be easily extended to more general finite difference schemes on body-fitted quadrilateral grids.

D.1 Smearing of the Interface

Because of the numerical difficulty caused by the Dirac delta function and by the sharp change of $\rho$ and $v$ across the interface, the Heaviside and Dirac delta functions are replaced with smoothed functions, i.e., to smear the interface. The Heaviside function is redefined as equation (10). Hence, the smoothed delta function is equation (11). The parameter $\epsilon$ is usually chosen to be the size of one to two cells.

D.2. Boundary Conditions

The appropriate boundary condition at the solid wall needs to be decided every time step according to the contact model of this invention. Referring to FIG. 3, C is the triple point, A is an arbitrary grid point on the wall, and $v_c$ is the tangent component of the velocity at the intersection of the interface and the dotted circle. The boundary condition at A is determined by equation (12).

D.3. The Extra Surface Tension

According to this contact model, it is necessary to add an extra surface tension in the form of a body force if the triple point is allowed to move. One easy implementation can be achieved by the use of "ghost level set" and assuming $\kappa_c$ is the curvature.

As shown in FIG. 4, suppose the triple point is now allowed to move forward (toward the side of the air). First, construct a straight line that makes an angle $\theta_a$ (measured from the liquid side) with the solid wall, as shown by the dash line in FIG. 4. "Ghost level set" values $(\phi^g)_{i,j}$ at nodes adjacent to the triple point are assigned by computing the signed distance to the interface AC and dashed line CA'. The extra surface tension is then computed as if $\kappa_c$ is the curvature given by equation (13), where all the gradients and divergence are computed by the standard central difference on uniform grids.

If the triple point is allowed to move backward (toward the liquid side), the same procedure of determining the extra surface tension is still followed, except that the straight line constructed should make an angle $\theta_r$ to the wall. The ghost level set is constructed and used only for the purpose of computing the extra surface tension when the contact line is allowed to move. It should not be used to compute any other quantity in the Navier-Stokes equations. It does not need to be computed if the contact line is not allowed to move.

D.4 Temporal Discretization

The level set is updated first by the use of equation (14). The algorithm for the time-centered advection term $[(u\cdot\nabla)\phi]^{n+1/2}$ is the same as the algorithm for the advection term $[(u\cdot\nabla)u]^{n+1/2}$ in the Navier-Stokes equations. Once $\phi^{n+1}$ is obtained, we compute the time-centered level set $\phi^{n+1/2}$ by equation (15).

An explicit temporal discretization is applied to both the advection and the viscosity terms. The discretized equation is as set forth in equation (16). Defining the velocity predictor u* by equation (17), the time-discretized, Navier-Stokes equations can be written as set forth in equation (18).

The temporal discretization for the viscosity term is first-order. It is accurate enough for ink jet simulation because the time step is very small. The central difference is applied to compute all the space derivatives in the viscosity term. The discretization of the advection term should be second-order in time and in space. One good choice is the explicit second-order Godunov scheme. However, it is believed that any other second-order scheme should also work well. It is clear that the determination of u* needs only values at time step n.

To satisfy the incompressibility condition for time step n+1, we apply the divergence operator on both sides of equation (18). Since $\nabla\cdot u^{n+1}=0$, the projection equation (19) is obtained. The projection equation is elliptic. It reduces to a Poisson's equation if the density ratio $\rho(\phi^{n+1/2})$ is a constant.

After the pressure $p^{n+1}$ is solved from equation (19), the velocity field $u^{n+1}$ can be obtained by (18).

D.4.4 Re-Initialization of the Level Set

To correctly capture the interface and accurately obtain the surface tension term, the level set needs to be maintained as a signed distance function to the interface. The level set is re-initialized as signed distance every few time steps in the program. Several re-initialization techniques can be found in the text: "Level Set Methods and Fast Marching Methods" by James A. Sethian, second edition, Cambridge University Press, 1999.

E. Implementations and Effects

The reason that the numerical level set implementation employed by this invention is mass-conservative lies in the way the extra surface tension and the relaxed boundary condition are handled. To ensure the conservation of mass, the triple point may not be artificially moved without following the velocity field determined by the Navier-Stokes equations and the continuity condition. Violation of the boundary condition used in the Navier-Stokes equations solver is not permitted either. In a preferred numerical implementation, the moving of the triple point is always through the relaxing of the no-slip boundary condition at the vicinity of the triple point and through the effect of the extra surface tension term in the Navier-Stokes equations.

The slipping contact line model of this invention offers advantages and improvements over conventional ink-jet simulation techniques. One advantage is the simulation of continuous ink droplet ejection. Experimental results show that, due to the transient effect, the second ejected droplet is always slightly bigger than the first one. Numerical simulation results using the contact model of this invention coincide with the observed evidence. However, numerical simulations without the invented contact model (i.e., using a constant contact angle as the boundary condition) show a smaller second ink droplet. Another noted improvement is the more accurate static capillary force. When the print head is not operating or when the printer is turned off, the nozzle inflow pressure is designed to be slightly lower than the atmospheric pressure to keep the ink from flowing out of the nozzle. The observed contact angle is within the range defined by the two critical angles. By setting the input voltage in FIG. 5 to zero, the equivalent circuit can simulate this inflow pressure and hence the CFD code can simulate the equilibrium position and shape of the ink-air interface in the nozzle. By assuming the initial ink-air interface is a straight line right at the nozzle opening and by using the invented contact model, the simulation shows that the ink at the center of the nozzle opening slowly retreats and the interface finally forms a contact angle between the advancing and receding critical contact angles. However, if the contact model is not applied and, say, a 90° constant contact angle is assumed, the equilibrium state can never be reached and the interface will keep retreating to the ink cartridge.

Figure 6:
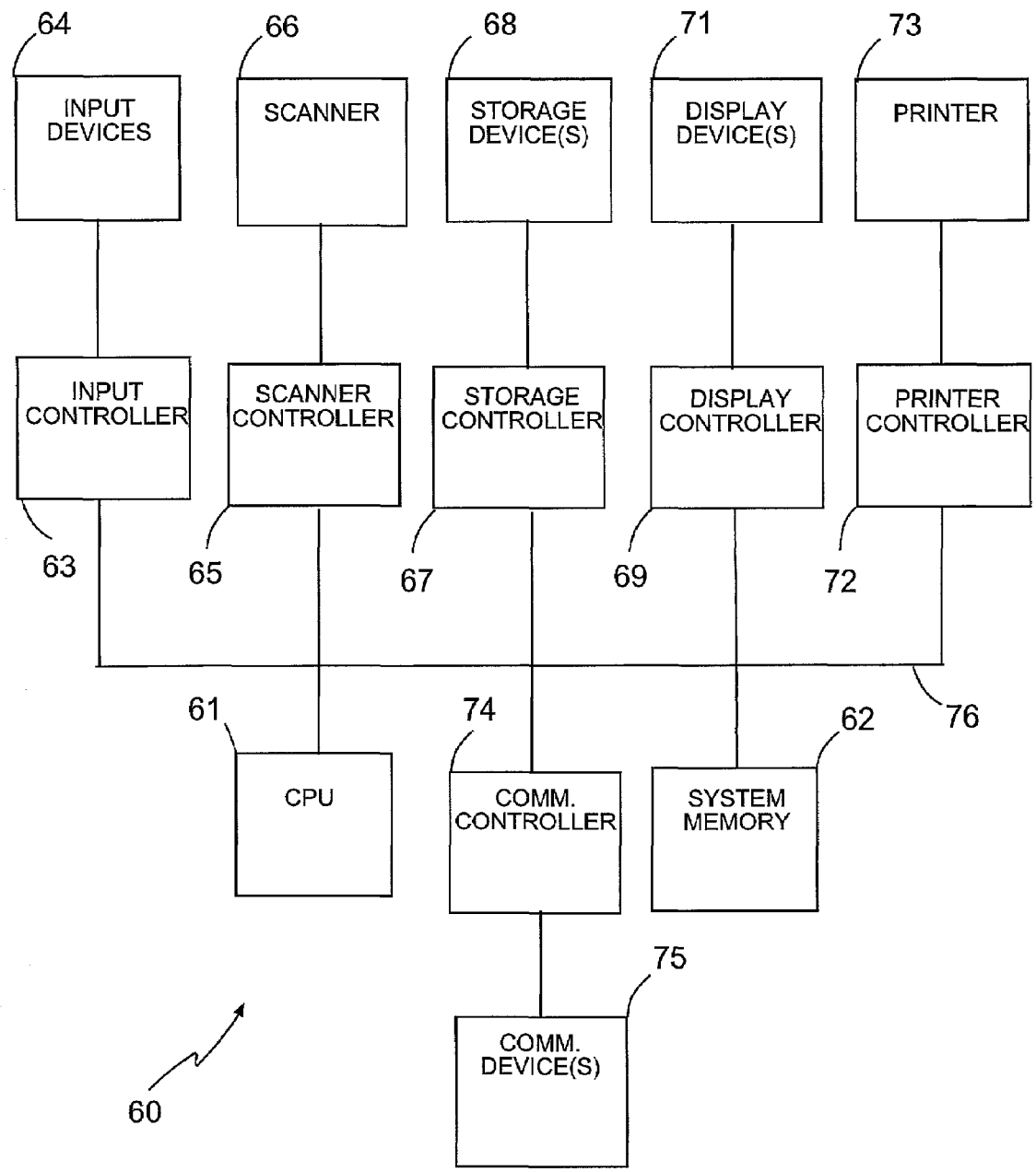
FIG. 6 is a block diagram illustrating an exemplary system which may be used to implement aspects of the present invention.

Having described the details of the simulation model of the invention, an exemplary system 60 which may be used to implement one or more aspects of the present invention will now be described with reference to FIG. 6. As illustrated in FIG. 6, the system includes a central processing unit (CPU) 61 that provides computing resources and controls the computer. CPU 61 may be implemented with a microprocessor or the like, and may also include a graphics processor and/or a floating point coprocessor for mathematical computations. System 60 further includes system memory 62 which may be in the form of random-access memory (RAM) and read-only memory (ROM).

A number of controllers and peripheral devices are also provided, as shown in FIG. 6. Input controller 63 represents an interface to various input devices 64, such as a keyboard, mouse or stylus. There is also a controller 65 which communicates with a scanner 66. A storage controller 67 interfaces with one or more storage devices 68 each of which includes a storage medium such as magnetic tape or disk, or an optical medium that may be used to record programs of instructions for operating systems, utilities and applications which may include embodiments of programs that implement various aspects of the present invention. Storage device(s) 68 may also be used to store processed or data to be processed in accordance with the invention. A display controller 69 provides an interface to a display device 71 which may be a cathode ray tube (CRT) or thin film transistor (TFT) display. A printer controller 72 is also provided for communicating with a printer 73. A communications controller 74 interfaces with one or more communication devices 75 which enables system 60 to connect to remote devices through any of a variety of networks including the Internet, a local area network (LAN), a wide area network (WAN), or through any suitable electromagnetic carrier signals including infrared signals.

In the illustrated system, all major system components connect to bus 76 which may represent more than one physical bus. However, various system components may or may not be in physical proximity to one another. For example, input data and/or output data may be remotely transmitted from one physical location to another. Also, programs that implement various aspects of this invention may be accessed from a remote location (e.g., a server) over a network. Such data and/or programs may be conveyed through any of a variety of machine-readable medium including magnetic tape or disk or optical disc, network signals, or any other suitable electromagnetic carrier signals including infrared signals.

The present invention may be conveniently implemented with software (e.g., CFD code 52). Also, the functions of the CFD code 52 could be realized, for example, using ASIC(s), digital signal processing circuitry, or the like. Accordingly, the "means" terms in the claims are intended to cover both software and hardware implementations. Similarly, the term "machine-readable medium" as used herein includes software, hardware having a program of instructions hardwired thereon, or combination thereof. With these implementation alternatives in mind, it is to be understood that the figures and accompanying description provide the functional information one skilled in the art would require to write program code (i.e., software) or to fabricate circuits (i.e., hardware) to perform the processing required.

While the invention has been described in conjunction with several specific embodiments, further alternatives, modifications, variations and applications will be apparent to those skilled in the art in light of the foregoing description. Thus, the invention described herein is intended to embrace all such alternatives, modifications, variations and applications as may fall within the spirit and scope of the appended claims.

APPENDIX $$\nabla \cdot u = 0. \tag{1}$$

$$\frac{Du}{Dt} = \tag{2}$$
$$-\frac{1}{\rho(\phi)}\nabla p + \frac{1}{\rho(\phi)\text{Re}}\nabla \cdot (2\mu(\phi)D) - \frac{1}{\rho(\phi)We}\kappa(\phi)\delta(\phi)\nabla\phi - \frac{1}{Fr}e_2.$$

$$D = \frac{1}{2}[\nabla u + (\nabla u)^T], \tag{3}$$
$$u = ue_1 + ve_2.$$

$$\phi(x, y, t) \begin{cases} < 0 & \text{if } (x, y) \in \text{fluid 2 (air)} \\ = 0 & \text{if } (x, y) \in \text{interface} \\ > 0 & \text{if } (x, y) \in \text{fluid 1 (liquid).} \end{cases} \tag{4}$$

$$n = \frac{\nabla\phi}{|\nabla\phi|}\bigg|_{\phi=0}, \tag{5}$$

$$\kappa = \nabla \cdot \left(\frac{\nabla\phi}{|\nabla\phi|}\right)\bigg|_{\phi=0}.$$

$$\rho(\phi) = (1 - \rho_2/\rho_1)H(\phi) + \rho_2/\rho_1,$$

$$\mu(\phi) = (1 - \mu_2/\mu_1)H(\phi) + \mu_2/\mu_1,$$

-continued $$\text{Re} = \frac{\rho_1 UL}{\mu_1}, \tag{6}$$

$$We = \frac{\rho_1 U^2 L}{\sigma},$$

$$Fr = \frac{U^2}{gL}.$$

$$\frac{\partial\phi}{\partial t} + u \cdot \nabla\phi = 0. \tag{7}$$

$$\frac{Du}{Dt} = -\frac{1}{\rho(\phi)}\nabla p + \frac{1}{\rho(\phi)\text{Re}}\nabla \cdot (2\mu(\phi)D) - \tag{8}$$
$$\frac{1}{\rho(\phi)We}\kappa(\phi)\delta(\phi)\nabla\phi + B_c - \frac{1}{Fr}e_2.$$

$$u^n = u(t = n\Delta t) \tag{9}$$

$$H(\phi) = \begin{cases} 0 & \text{if } \phi < -\epsilon \\ \frac{1}{2}\left[1 + \frac{\phi}{\epsilon} + \frac{1}{\pi}\sin(\pi\phi/\epsilon)\right] & \text{if } |\phi| \leq \epsilon \\ 1 & \text{if } \phi > \epsilon. \end{cases} \tag{10}$$

$$\delta(\phi) = \frac{dH(\phi)}{d\phi}. \tag{11}$$

$$\begin{cases} \text{No-slip} & \text{if distance}(A, C) > \epsilon_c, \\ \text{No-slip} & \text{if } \theta_r < \theta < \theta_a, \\ \text{No-slip} & \text{if } (\theta > \theta_a \text{ and } v_c < 0) \text{ or } (\theta < \theta_r \text{ and } v_c > 0), \\ \text{Free-slip} & \text{otherwise.} \end{cases} \tag{12}$$

$$B_c = -\delta_c\kappa_c(\theta, \phi_g)\nabla\phi_g/(\rho(\phi)We_c), \tag{13}$$

$$\delta_c = \begin{cases} 0 & \text{if distance } [(x, y), C] > \epsilon_c \\ \frac{1}{\epsilon_c}[1 + \cos(\pi\phi_g/\epsilon_c)] & \text{otherwise,} \end{cases}$$

$$\kappa_c(\theta, \phi_g) = \nabla \cdot \left(\frac{\nabla\phi_g}{|\nabla\phi_g|}\right).$$

$$\phi^{n+1} = \phi^n - \Delta t[u \cdot \nabla\phi]^{n+1/2}. \tag{14}$$

$$\phi^{n+1/2} = \frac{1}{2}(\phi^n + \phi^{n+1}). \tag{15}$$

$$\frac{u^{n+1} - u^n}{\Delta t} + [(u \cdot \nabla)u]^{n+1/2} = -\frac{1}{\rho(\phi^{n+1/2})}\nabla p^{n+1} + \tag{16}$$
$$\frac{1}{\rho(\phi^{n+1/2})\text{Re}}\nabla \cdot [2\mu(\phi^{n+1/2})D^n] - \frac{1}{\rho(\phi^{n+1/2})We}[\kappa(\phi)\delta(\phi)\nabla\phi]^{n+1/2} - \frac{1}{Fr}e_2.$$

$$u^* = u^n + \Delta t\bigg\{-[(u \cdot \nabla)u]^{n+1/2} + \frac{1}{\rho(\phi^{n+1/2})\text{Re}}\nabla \cdot [2\mu(\phi^{n+1/2})D^n] - \tag{17}$$
$$\frac{1}{\rho(\phi^{n+1/2})We}[\kappa(\phi)\delta(\phi)\nabla\phi]^{n+1/2} - \frac{1}{Fr}e_2\bigg\}.$$

$$u^{n+1} = u^* - \frac{\Delta t}{\rho(\phi^{n+1/2})}\nabla p^{n+1}. \tag{18}$$

$$\nabla \cdot u^* = \nabla \cdot \left(\frac{\Delta t}{\rho(\phi^{n+1/2})}\nabla p^{n+1}\right). \tag{19}$$

What is claimed is:

1. A method for simulating and analyzing fluid flow through at least a portion of, and ejection from, a channel, comprising the steps of:

(a) setting a pressure indicative of the flow of a first fluid into the channel;

(b) calculating, based on the inflow pressure of the first fluid, (i) the flow velocity of the first fluid through at least a portion of the channel, (ii) location of a triple point formed at the intersection of the first fluid, a second fluid and a wall of the channel, and (iii) a pressure related to the flow of the first fluid through the channel, wherein, in making the calculations in step (b), a free-slip boundary condition is imposed near the triple point allowing the triple point to move if a contact angle between the first fluid and a channel wall is greater than or equal to a first angle value or if the contact angle is less than or equal to a second angle value which is less than the first angle value, and an extra surface tension is included as a body force term in the calculation of the flow acceleration of the first fluid through at least the portion of the channel; and (c) simulating and displaying the flow of the first fluid through at least the portion of, and ejection from, the channel; and wherein, in the simulation, the first fluid represents ink, the second fluid represents air, and the channel represents an ink-jet nozzle that is part of a piezoelectric ink-jet head.

2. The method of claim 1, wherein the triple point is permitted to move toward the second fluid if the contact angle is greater than or equal to the first angle value.

3. The method of claim 2, wherein the triple point is permitted to move toward the first fluid if the contact angle is less than or equal to the second angle value.

4. The method of claim 3, wherein, if the contact angle is greater than or equal to the first angle value and a tangential velocity component of the first fluid velocity is greater than zero, or if the contact angle is less than or equal, to the second angle value and the tangential velocity component of the first fluid velocity is less than zero, the free-slip boundary condition is imposed within a predetermined radius.

5. The method of claim 3, wherein the triple point is accelerated toward the second fluid in accordance with the surface tension body force term if the contact angle is greater than the first angle value, and the triple point is accelerated toward the first fluid in accordance with the surface tension body force term if the contact angle is less than the second angle value.

6. The method of claim 1, wherein the triple point is not permitted to move if the contact angle is greater than the second angle value and less than the first angle value.

7. The method of claim 1, wherein the level set method is employed in the calculations in step (b).

8. An apparatus for simulating and analyzing fluid flow through at least a portion of, and ejection from, a channel, comprising:

means for calculating, based on an inflow pressure indicative of the flow of a first fluid into the channel, (i) the flow velocity of the first fluid through at least a portion of the channel, (ii) location of a triple point formed at the intersection of the first fluid, a second fluid and a wall of the channel, and (iii) a pressure related to the flow of the first fluid through the channel, wherein, in making the calculations, a free-slip boundary condition is imposed near the triple point allowing the triple point to move if a contact angle between the first fluid and a channel wall is greater than or equal to a first angle value or if the contact angle is less than or equal to a second angle value which is less than the first angle value, and an extra surface tension is included as a body force term in the calculation of the flow acceleration of the first fluid through at least the portion of the channel; and means for simulating and displaying the flow of the first fluid through at least the portion of, and ejection from, the channel; and wherein, in the simulation, the first fluid represents ink, the second fluid represents air, and the channel represents an ink-jet nozzle that is part of a piezoelectric ink-jet head.

9. The apparatus of claim 8, wherein the calculating means comprises a program of instructions embodied in software, hardware, or combination thereof.

10. The apparatus of claim 8, wherein the simulating and displaying means comprises a display for visually observing the simulation.

11. A computer-readable storage medium having a program of instructions for directing a machine to simulate and analyze fluid flow through at least a portion of, and ejection from, a channel, comprising:

(a) instructions for setting a pressure indicative of the flow of a first fluid into the channel;

(b) instructions for calculating, based on the inflow pressure of the first fluid, (i) the flow velocity of the first fluid through at least a portion of the channel, (ii) location of a triple point formed at the intersection of the first fluid, a second fluid and a wall of the channel, and (iii) a pressure related to the flow of the first fluid through the channel, wherein, in making the calculations in (b), a free-slip boundary condition is imposed near the triple point allowing the triple point to move if a contact angle between the first fluid and a channel wall is greater than or equal to a first angle value or if the contact angle is less than or equal to a second angle value which is less than the first angle value, and an extra surface tension is included as a body force term in the calculation of the flow acceleration of the first fluid through at least the portion of the channel; and (c) instructions for simulating and displaying the flow of the first fluid through at least the portion of, and ejection from, the channel; and wherein, in the simulation, the first fluid represents ink, the second fluid represents air, and the channel represents an ink-jet nozzle that is part of a piezoelectric ink-jet head.

12. The computer-readable storage medium of claim 11, wherein the triple point is permitted to move toward the second fluid if the contact angle is greater than or equal to the first angle value.

13. The computer-readable storage medium of claim 12, wherein the triple point is permitted to move toward the first fluid if the contact angle is less than or equal to the second angle value.

14. The computer-readable storage medium of claim 13, wherein, if the contact angle is greater than or equal to the first angle value and a tangential velocity component of the first fluid velocity is greater than zero, or if the contact angle is less than or equal to the second angle value and the tangential velocity component of the first fluid velocity is less than zero, the free-slip boundary condition is imposed within a predetermined radius.

15. The computer-readable storage medium of claim 13, wherein the triple point is accelerated toward the second fluid in accordance with the surface tension body force term if the contact angle is greater than the first angle value, and the triple point is accelerated toward the first fluid in accordance with the surface tension body force term if the contact angle is less than the second angle value.

16. The computer-readable storage medium of claim 11, wherein the triple point is not permitted to move if the contact angle is greater than the second angle value and less than the first angle value.

17. The computer-readable storage medium of claim 11, wherein the level set method is employed in the calculations in (b).

* * * * *

UNITED STATES PATENT AND TRADEMARK OFFICE
CERTIFICATE OF CORRECTION

| | | |
|---|---|---|
| PATENT NO. | : 7,085,695 B2 | |
| APPLICATION NO. | : 10/105138 | |
| DATED | : August 1, 2006 | |
| INVENTOR(S) | : Jiun-Der Yu et al. | |

It is certified that error appears in the above-identified patent and that said Letters Patent is hereby corrected as shown below:

Column 11, line 36, after "equal" delete ","
Column 12, line 26, change "selling" to --setting--

Signed and Sealed this

Nineteenth Day of December, 2006

JON W. DUDAS
*Director of the United States Patent and Trademark Office*